(12) United States Patent
Stettner

(10) Patent No.: US 9,009,343 B2
(45) Date of Patent: Apr. 14, 2015

(54) MANAGING UNUSED MEDIA STREAMS

(75) Inventor: Armando P. Stettner, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 677 days.

(21) Appl. No.: 11/959,089

(22) Filed: Dec. 18, 2007

(65) Prior Publication Data

US 2009/0157826 A1   Jun. 18, 2009

(51) Int. Cl.
  *G06F 15/16* (2006.01)
  *H04L 29/06* (2006.01)
  *H04L 12/825* (2013.01)

(52) U.S. Cl.
  CPC ............ *H04L 65/4076* (2013.01); *H04L 47/25* (2013.01); *H04L 47/263* (2013.01); *H04L 65/80* (2013.01)

(58) Field of Classification Search
  CPC ..... H04L 65/00; H04L 65/10; H04L 65/1066; H04L 65/40; H04L 65/4069; H04L 65/4084; H04L 65/60; H04L 65/4076; H04L 65/80; H04L 67/08; H04L 67/14; H04L 67/22; H04L 67/24; H04L 67/32–67/325; H04L 47/263; H04L 47/00; H04L 47/10–47/522; H04L 47/2425; H04L 47/781; H04L 47/822
  USPC ......... 709/206, 201–204, 207, 217, 219–220, 709/223–224, 229, 231–232, 235, 238, 709/244; 370/229, 232, 237
  See application file for complete search history.

(56) References Cited

U.S. PATENT DOCUMENTS

| | | | |
|---|---|---|---|
| 7,000,013 B2 * | 2/2006 | Mei et al. ...................... | 709/223 |
| 8,531,954 B2 * | 9/2013 | McNaughton et al. ........ | 370/235 |
| 2006/0015558 A1 * | 1/2006 | Bodin et al. .................. | 709/204 |
| 2006/0047805 A1 * | 3/2006 | Byrd et al. .................... | 709/224 |
| 2006/0050721 A1 * | 3/2006 | Ganesan ........................ | 370/401 |
| 2006/0136421 A1 * | 6/2006 | Muthukrishnan et al. ...... | 707/10 |
| 2007/0028270 A1 * | 2/2007 | Ostojic et al. .................. | 725/53 |
| 2007/0143777 A1 * | 6/2007 | Wang .............................. | 725/18 |
| 2007/0220577 A1 * | 9/2007 | Kongalath .................... | 725/131 |
| 2007/0294737 A1 * | 12/2007 | Edwards et al. .............. | 725/112 |
| 2008/0062877 A1 * | 3/2008 | Chen ............................. | 370/235 |
| 2008/0063003 A1 * | 3/2008 | O'Neal ......................... | 370/408 |
| 2008/0089239 A1 * | 4/2008 | Todd et al. ..................... | 370/252 |
| 2008/0127282 A1 * | 5/2008 | Bigley et al. .................... | 725/87 |
| 2008/0205389 A1 * | 8/2008 | Fang et al. ..................... | 370/389 |

\* cited by examiner

*Primary Examiner* — Saleh Najjar
*Assistant Examiner* — Eric W Shepperd

(57) ABSTRACT

A content processing device is configured to selectively receive a media signal via a network. The content processing device is further configured to receive a bandwidth check request. The content processing device is further configured to receive a first status indicator, and determine if the streaming media signal is likely to be in use based on the first status indicator.

23 Claims, 3 Drawing Sheets

MANAGING UNUSED MEDIA STREAMS

BACKGROUND INFORMATION

Content processing devices, such as a set-top box (STB), can receive media from a content provider using any number of different mechanisms. In a conventional media distribution system, a content provider continuously sends a media signal that includes many media channels to a content processing device. The content processing device can then "tune" or select a channel from the media signal, and provide that media channel to a consumer, typically using a media player, such as a television. Unfortunately, such systems use a great deal of bandwidth by including a plurality of media channels in the media signal that is provided to every content processing device.

Media distribution systems seek to use their available bandwidth more efficiently. For example, some media distribution systems, such as switched-video and internet protocol television (IPTV) systems, use less bandwidth by limiting which media channels are sent to a content processing device. Generally, the content provider in such systems streams media content to a content processing device in response to a request from a consumer. For example, if a consumer using an STB requests a particular media channel or on-demand service, the content provider begins streaming the requested content to the STB.

Switched-video and IPTV systems use their available bandwidth more efficiently than conventional systems. However, as content providers include more media channels, on-demand services, and high definition channels, and cater to more customers, using the available bandwidth efficiently remains a priority. As such, many content providers are seeking additional ways to increase bandwidth efficiency, for example, by managing unused media streams.

DETAILED DESCRIPTION OF PREFERRED EMBODIMENTS

Figure 1:
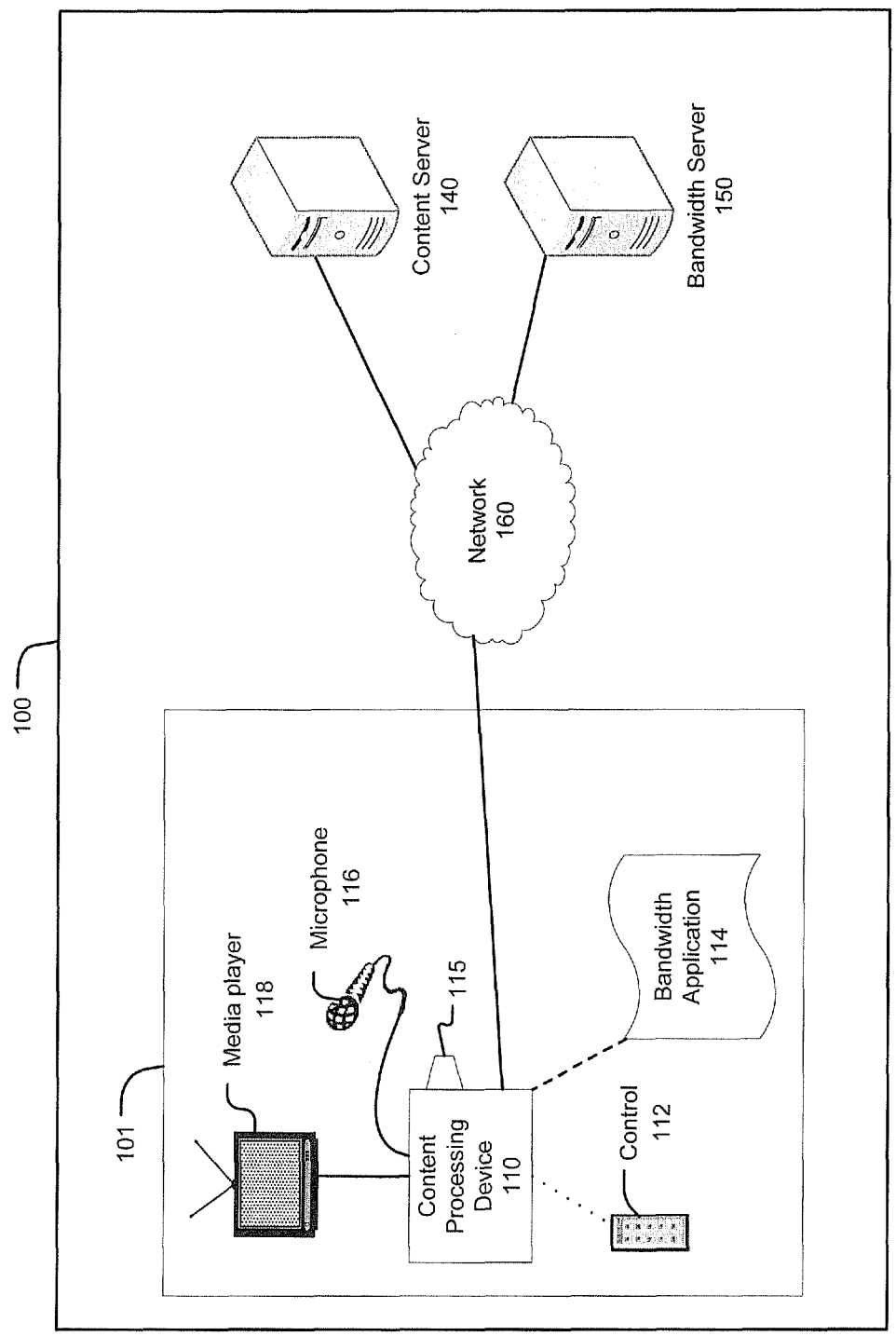
FIG. 1 illustrates an exemplary system for managing unused media streams.

FIG. 1 illustrates an exemplary system 100 for managing unused streaming media signals, e.g., media streams, in a selective media distribution system. Generally, a content provider provides media content to a customer premises 101 via a streaming media signal, generally through a network. A content provider is generally a distributor of media content that provides a streaming media signal to customer premises 101, such as a cable company, satellite company, or the like that is capable of managing unused streaming media signals utilizing the disclosed systems and methods. Customer premises 101 may be a home, business, or any other location that includes a content processing device 110, and may include multiple content processing devices 110.

In a selective media distribution system, such as a switched-video or Internet protocol television (IPTV) media distribution system, customer premises 101 receives a streaming media signal in a content processing device 110, generally via a network 160. A content server 140 generally represents any system or device that streams media content to content processing device 110, generally in response to a request from content processing device 110. Typically, a user interacts with content processing device 110 using a control 112 and a media player 118, and a user can select available media content from content server 140. In response, content processing device 110 requests that particular media content, such as a video channel, from content server 140, which then streams the requested media content to content processing device 110. Content processing device 110 can then provide the selected media content to a media player 118. When a user selects a different media content to receive, content processing device 110 requests that media content. In response, content server 140 typically terminates the first streaming media signal, and initiates a second streaming media signal that includes the newly requested media content.

In such systems, media content is commonly streamed to a customer premises 101, but is not being perceived by a user, or being recorded for later use. Generally, once a user is finished with the desired media content, the user typically turns off media player 118, but leaves content processing device 110 powered on. Unfortunately, content server 140 continues to provide a streaming media signal with the requested media content to content processing device 110, even though the user is neither viewing nor recording the requested media content. If the streamed media content is not being viewed or recorded, then the bandwidth currently occupied by the streaming media signal carrying the streamed media content is considered unused, meaning that it could be reallocated to another activity. Since such systems operate with limited bandwidth, managing such unused media streams, for example, by terminating such unused media streams, can increase the overall bandwidth efficiency of system 100.

Content processing device 110 is generally a specialized device, e.g., a set top box (STB) or similar device, for requesting and receiving media content from a content server 140 via a network 160. Content processing device 110 also selectively provides the received media content to a media player 118. Content processing device 110 generally includes a processor and a memory, and may be provided with a proprietary or specialized operating system, embedded software, or the like. For example, content processing device 110 may be an STB provided with a real time operating system (RTOS) such as is known. However, it is to be understood that the role generally ascribed to content processing device 110 herein may be filled by a computing device such as a computer or a mobile device such as a cellular telephone, so long as the device is capable of requesting and receiving media content from content server 140 via network 160, and is capable of storing and executing such program instructions as may be stored on a computer-readable medium. For example, content processing device 110 may also be a digital video recorder, a personal video recorder, a video game console, a cellular phone, a computer, a hand-held video player, or a television.

Content processing device 110 may include one or more additional hardware and/or software components for providing additional capabilities to a user, and for determining whether the currently streaming media content is likely to be in use. For example, content processing device 110 may include digital recording capabilities, for example, by including a digital video recorder (DVR), thereby allowing a user to pause, rewind, record, and store media content received from content server 140. Further, content processing device 110 may include an electrical outlet for providing power to another device, for example, to provide power to a media player 118. Content processing device 110 may also include hardware and/or software for sensing electrical current, resistance, impedance, or a magnetic field, for example, associated with an electrical outlet or some other input or output port. For example, content processing device 110 may include hardware and/or software for detecting when media player 118 is powered, such as by detecting electrical current in an electrical outlet that is providing electricity to media player 118.

Content processing device 110 may also include a media output port 115 for providing a media signal to another device or peripheral. For example, content processing device 110 may include one or more media output ports 115 of various types, including: coaxial, composite video, component video, separate video (S-video), high-definition multimedia interface (HDMI), digital visual interface (DVI), video graphics array (VGA), universal serial bus (USB), and DisplayPort. A peripheral device may be a speaker, a video cassette recorder (VCR), a digital video disk (DVD) player/recorder, a television, a computer, a digital video recorder (DVR), a personal video recorder (PVR), a stereo unit, a receiver, or media player 118. Content processing device 110 may include hardware and/or software to detect whether a media signal is being transmitted through a media output port 115, for example, by detecting electrical current.

Content processing device 110 may also include hardware and/or software for detecting people. For example, content processing device 110 may include a motion sensor, an infrared detector, a heat detector, a video camera, a proximity sensor, or some other device used for detecting the presence of people.

Further, content processing device 110 may include any number of additional hardware and software components for sensing, receiving, storing, analyzing, and/or processing acoustic signals or sounds. For example, as illustrated in FIG. 1, content processing device 110 may include a microphone 116, that may be internally or externally connected to or attached to content processing device 110. For example, microphone 116 may be an internal microphone substantially within content processing device 110, or externally connected and communicating with content processing device 110. Microphone 116 may communicate with content processing device 110 through various mechanisms, including wired or wireless transmission mechanisms. Microphone 116 may be positioned within customer premises 101 to receive acoustic signals from media player 118. For example, microphone 116 may be positioned near a speaker connected to a television.

Further, content processing device 110 may include a bandwidth application 114 for assisting a content provider in managing unused media streams, i.e., unused streaming media signals. Bandwidth application 114 may include computer readable instructions for performing one or more operations of process 200, as will be discussed in greater detail below. Further, bandwidth application 114 may be included in any device configured to receive media content from content server 140, such as a set-top box (STB), a digital video recorder (DVR), a personal video recorder (PVR), a video game console, a cellular phone, a computer, a hand-held video player, or a television.

Media content may be provided as an analog signal or as a digital signal, e.g., an analog or digital video signal including a media stream, a streaming media signal, or the like. Media content may include a plurality of media channels, including various television, movie, and music channels. Media content may also include various services, such as interactive games, on-demand programming, an interactive program guide, Internet web pages, etc.

Media player 118 receives media content from content processing device 110, and plays such media content so that it can be perceived by a user. Media player 118 may be a television receiver, such as is known, including a television or a high definition television (HDTV). Media player 118 may also be used to provide a user interface to certain functions and menus provided by content processing device 110. For example, a television may be used to display a graphical user interface to access various menus within a STB. Further, it is possible, and in many cases likely, that operations ascribed herein to content processing device 110 and media player 118 may all or mostly be performed by a computing device, whereby media player 118 and/or content processing device 110 may be omitted from system 100.

A user may use a control 112 to operate content processing device 110. Control 112 is generally a remote control that can selectively communicate with content processing device 110 through known communications including infrared (IR) and radio frequency (RF) communications. Control 112 may include numeric keys, arrow buttons, keys for specific functions, directional keys, etc., and may also include alphanumeric keys. Control 112 may also be a wired or wireless keyboard or gamepad or another Human Interface Device (HID) as is known. A user may utilize control 112 to select media content channels, access various menus and optional settings, make selections and requests, input data, and respond to one or more dialog boxes from content processing device 110. Control 112 generally facilitates access to various functions and menus provided by or through content processing device 110, and may also be used to control other devices, including media player 118.

Content processing device 110 selectively communicates with various devices via network 160, including content server 140 and a bandwidth server 150. Content processing device 110 may also utilize one or more networking devices that are generally known for routing network traffic, such as a router. Network 160 may be a media distribution network for providing media content to a customer premises 101, such as is known. For example, network 160 may include hardware and software for providing a video signal via a coaxial cable, a fiber optic cable, or via one or more wireless transmission systems, such as are known. Network 160 may also be a packet switched network, which is generally an internet protocol (IP) network that utilizes known protocols found generally within the internet protocol suite. Further, network 160 may include a variety of networks such as a wide area network (WAN), e.g., the Internet, a local area network (LAN), a fiber-optic network, asynchronous transfer mode (ATM) networks, etc. As is known, network 160 may be used to transport a variety of data, including multimedia data, such as audio and video. In an IPTV media distribution system, network 160 is typically a packet switched network 125. In a switched-video media distribution system, network 160 is typically an RF-based media distribution network, such as common cable television networks, that allows for two-way communication over network 160 between content processing device 110, and one or more computing devices. Of course, network 160 may be a hybrid fiber-coaxial (HFC) system, a fiber to the x (FTTX) system, or some other network for delivering media content to customer premises 101, as is known.

Bandwidth server 150 is generally a networked computing device that communicates with various devices connected to network 160, including content processing device 110 and content server 140. Bandwidth server 150 may send and receive data to content processing device 110 in order to reclaim unused bandwidth. Further, bandwidth server 150 may communicate with various networking devices, such as network routers, to control, manage, and/or determine the current level of available bandwidth in network 160. As will be discussed in greater detail below with reference to FIG. 2, bandwidth server 150 may receive a message from content processing device 110 indicating that streamed media content is not in-use, and respond by sending a message to content server 140 to terminate the media content stream.

As discussed above, content server 140 selectively provides media content to content processing device 110, generally via a streaming media signal. A streaming media signal may be initiated or requested by a user, content processing device 110, a DVR, PVR, or the like. Media content, such as a television channel, continues to be streamed to content processing device 110 even though a user is no longer perceiving or recording the streamed media content. If the streamed media content is not being viewed or recorded, then the bandwidth currently occupied by the streaming media signal is considered unused, meaning that it can be reallocated to another activity.

Figure 2:
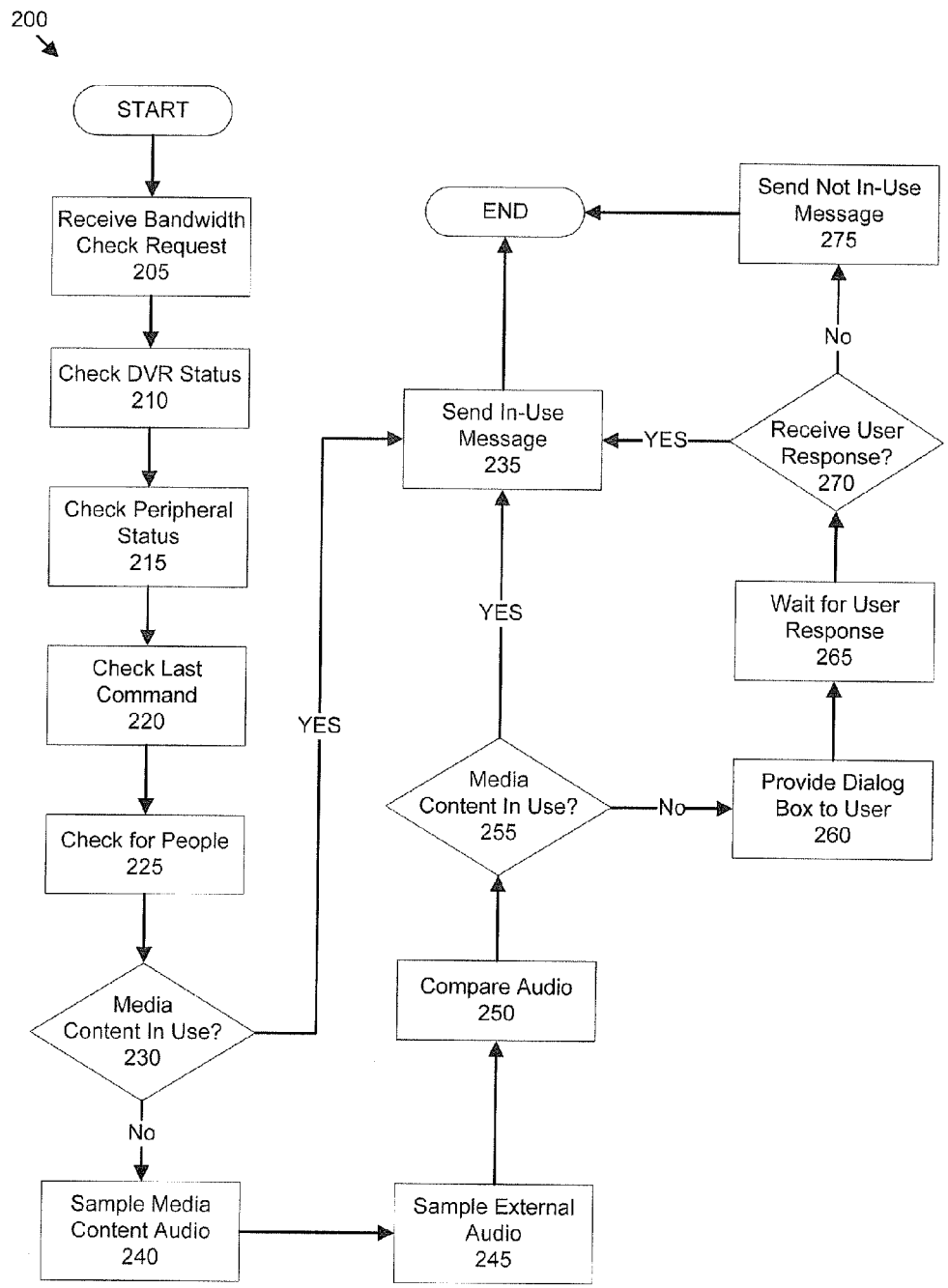
FIG. 2 illustrates an exemplary process for determining if currently streaming media content is likely to be in use.

FIG. 2 illustrates an exemplary process 200 for determining if a currently streaming media signal is in use. Process 200 begins in step 205 when content processing device 110 receives a bandwidth check request, typically from bandwidth server 150. Bandwidth server 150 may periodically poll content processing device 110, such as by sending a bandwidth check request every hour. Further, bandwidth server 150 may send a bandwidth check request in response to an external event. An external event may be a message from network 160 indicating that bandwidth utilization has reached a pre-determined level or percentage, such as during peak television viewing times. Further, a network operator may initiate a bandwidth check request using bandwidth server 150. Of course, a bandwidth check request may be sent by some other computing device in communication with network 160, such as content server 140, a router, a network monitoring server, or the like. A bandwidth check request may be a notification from a networking device that current bandwidth utilization is high. Or, a bandwidth check request may be initiated by content processing device 110, for example, based on a pre-determined event, time, schedule, or the like.

Next, in step 210, content processing device 110 checks to see if any digital video recording features are currently in use. For example, content processing device 110 may check to see if the media content currently being received from content server 140 is being recorded, paused, rewound, or if a user is using some other digital video recording function.

Next, in step 215, content processing device 110 checks to see if a peripheral device is in use. For example, content processing device 110 may include hardware and/or software for detecting whether media player 118 is powered-on by detecting electrical current from an electrical outlet associated with content processing device 110. Further, content processing device 110 may include hardware and/or software for detecting whether a peripheral device is currently receiving a media signal from media output port 115. For example, content processing device 110 may detect electrical current traveling through media output port 115.

Next, in step 220, content processing device 110 checks to see when a user last issued a command. Generally, a user will use control 112 to operate content processing device 110, such as by requesting media content from content server 140, using a DVR function, accessing internal features and settings, etc. Content processing device 110 may check the current time, and then check the time a user last issued a command using control 112.

Next, in step 225, content processing device 110 checks for the presence of people. For example, content processing device 110 may include a motion sensor, an infrared detector, a heat detector, a video camera, a proximity sensor, or some additional hardware and/or software for detecting the presence of a person.

Next, in step 230, content processing device 110 determines if the media content currently being streamed from content server 140 is likely to be in use based on a status indicator. The status indicator is generally based on a status check of multiple sources of information, features, etc. For example, a status indicator can be generated based on a status check of a DVR function. Generally, the status indicator is based on the output of steps 210-225 and indicates whether or not the received streaming media signal is likely to be in use by a user. Content processing device 110 may check the output of steps 210, 215, 220, and 225 to make the determination. For example, content processing device 110 may receive a status indicator suggesting that the media content is likely in use if the currently received streaming media signal is being recorded. If a user is currently using a digital video recording function, then content processing device 110 may determine that the media content is in use, and generate a status indicator based on that determination. Further, content processing device 110 may determine that the media content is likely to be in use based on the status of a peripheral device. For example, content processing device 110 may detect electrical current traveling through media output port 115. Further, content processing device 110 may determine that the media content is likely to be in use because a user recently issued a command. If a user recently issued a command, such as by changing the channel within approximately the last thirty (30) minutes, then content processing device 110 may determine that the media content is likely to be in use. Of course, the exact time frame may vary, and may depend on the user's request. For example, if a user requested a move within the previous hour, content processing device 110 may determine that the media content, i.e. the movie, is likely in use. Further, content processing device 110 may detect the presence of people, such as by using a motion detector, a video camera, an infrared detector, or the like, and determine that the media content is likely in use. Generally, content processing device 110 generates a status indicator based on one or more status checks of various components, features, devices, etc. For example, the status indicator may be based on a status check of a digital video recorder; a status check of a peripheral device; a time of a user command; or a check for the presence of a person in proximity to content processing device 110. Generally, the status indicator includes information about whether or not the currently received streaming media signal is likely to be in use. For example, the status indicator may simply include a flag indicating that the streaming media signal is likely to be in use. Further, the status indicator may include detailed information regarding the output of steps 210-225. Content processing device 110 may then use the status indicator to send a message, as discussed in detail below. If content processing device 110 determines, based on the status indicator, that the media content is likely to be in use, then process 200 proceeds to step 235. If content processing device 110 determines that the currently streaming media content is not in use, then process 200 proceeds to step 240.

In step 235, content processing device 110 sends an in-use message, generally to bandwidth server 150. Generally, such an in-use message indicates that the media content currently being streamed to content processing device 110 is in-use, for example, by being recorded. An in-use message may include a media content identifier, a streaming media signal identifier, a content processing device identifier, such as a hardware address, a media access control (MAC) address, an Internet protocol (IP) address, or the like. An in-use message may also include a customer premises identifier, such as an address, an account number, or the like. Further, the in-use message may include one or more codes indicating why content processing device 110 determined that the media content is in use, such as by including the status indicator. For example, the in-use message may include a code indicating that the currently streaming media signal is being recorded. In addition, the in-use message may include a media content identifier. Of course, content processing device 110 may send the in-use message to any computing device in communication with network 160, and need not only send the in-use message to bandwidth server 150. For example, content processing device 110 may send the in-use message to a networking device or to content server 140. After sending an in-use message, process 200 ends.

In step 240, content processing device 110 samples an audio portion of the currently streamed media content. Generally, content processing device 110 samples the audio portion of the streaming media signal as the media content is provided to media player 118, generally before the content is placed onto the media output port. Sampling an audio portion of the media content at this particular juncture allows content processing device 110 to account for potential use of digital video recording functions, processing latency, etc.

Next, in step 245, content processing device 110 receives an audio sample from microphone 116. As discussed above, microphone 116 may be placed in customer premises 101 to receive acoustic signals from media player 118, such as near a speaker.

Next, in step 250, content processing device 110 compares the audio sample from step 230, to the audio sample from step 235. The comparison attempts to determine if the currently received streamed media content is currently being played through media player 118. Of course, the comparison may use any number of acoustic analysis techniques to determine if the media content from content processing device 110 is currently being played through media player 118. For example, content processing device 110 may take into account various acoustic issues involved in a typical room and/or entertainment system cabinetry. Further, content processing device 110 may only analyze a subset of frequencies in the compared audio samples, such as by comparing low frequency components of the audio samples. Of course, content processing device 110 may employ several acoustic analysis techniques to increase reliability and accuracy. For example, content processing device 110 may generate a confidence value after a comparison. If the confidence value is within a certain range that indicates a questionable result, content processing device 110 may then perform another comparison, possibly using a different analysis technique.

Next, in step 255, content processing device 110, using the output of step 250, determines if the media content is in-use. If content processing device 110 determines that the media content is currently being played, possibly using media player 118, then process 200 proceeds to step 235. If content processing device 110 determines that the media content is not currently being played using media player 118, then process 200 proceeds to step 260.

In step 260, content processing device 110 provides a graphical dialog box to a user through media player 118. Generally, the dialog box offers a user the opportunity to inform content processing device 110 that the media content is currently in use. For example, perhaps the user has turned down the volume, or muted the media content, but desires to continue receiving the media content from content server 140.

Next, in step 265, content processing device 110 waits for a response to the dialog box from a user. Content processing device 110 may wait for a pre-determined amount of time, such as between approximately one (1) and ten (10) minutes. The wait time may depend on additional factors, such as the time of day, time from last user input, network usage, etc.

Next, in step 270, content processing device 110 determines if a user responded to the dialog box. If a user responded to the dialog box, then process 200 proceeds to step 235. If content processing device 110 did not receive a response from a user, then process 200 proceeds to step 275.

In step 275, content processing device 110 sends a not in-use message, generally to bandwidth server 150. The not in-use message generally indicates that the currently streamed media content is not in use by a user in customer premises 101. The not in-use message may also include a content processing device identifier, and/or a customer premises identifier, similar to the in-use message as discussed above with reference to step 235. Following step 275, process 200 ends.

Figure 3:
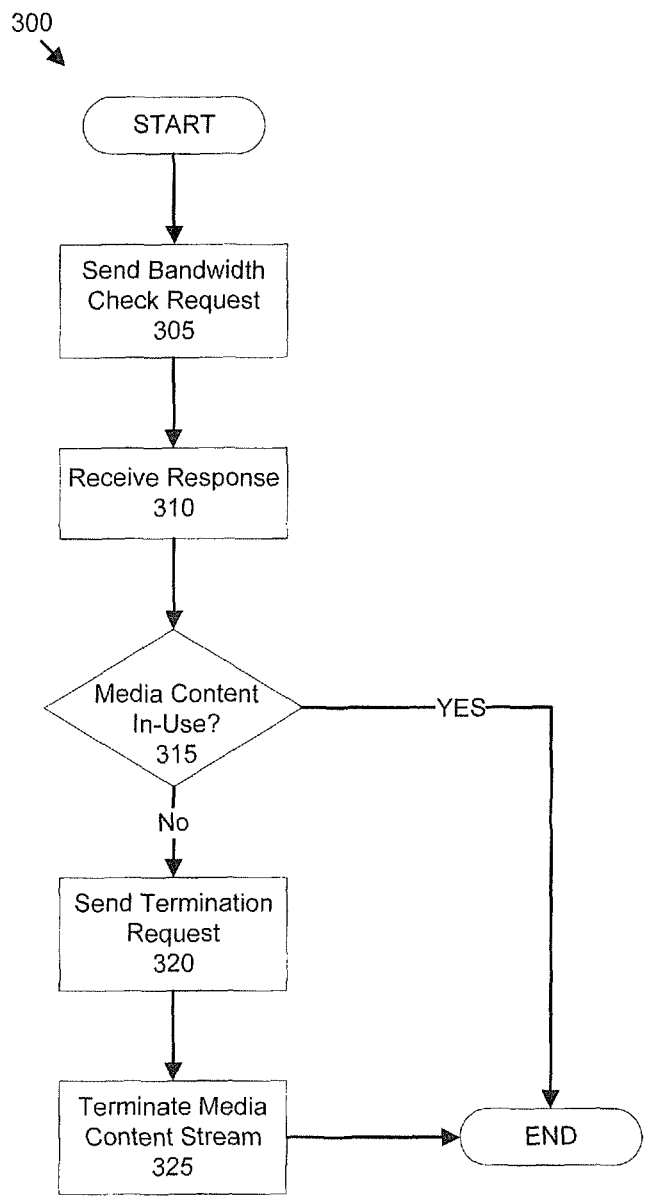
FIG. 3 illustrates an exemplary process for terminating an unused media stream.

FIG. 3 illustrates an exemplary process 300 for terminating an unused media stream between content server 140 and content processing device 110. Process 300 begins in step 305 when bandwidth server 150 sends a bandwidth check request to a content processing device 110. As discussed above, bandwidth server 150 may periodically send such bandwidth check requests to content processing device 110. Further, bandwidth server 150 may send a bandwidth check request in response to a high bandwidth utilization indicator from a networking device. Generally, a bandwidth check request is sent over network 160, and may be sent to a plurality of content processing devices 110. For example, bandwidth server 150 may receive a notification that one portion of network 160 is experiencing heavy network traffic. In response, bandwidth server 150 may send a bandwidth check request to a plurality of content processing devices 110 that are connected to that portion of network 160.

Next, in step 310, bandwidth server 150 receives a response from content processing device 110. Further, bandwidth server 150 may receive a response from a plurality of content processing devices 110. As discussed above with reference to steps 225 and 265 in process 200, the response may be an in-use, or a not in-use message. Further, the response may include a content processing device identifier, and/or a customer premises identifier.

Next, in step 315, bandwidth server 150 determines if the media content currently streaming to content processing device 110 is in use. If bandwidth server 150 receives an in-use message from content processing device 110, then the media content is determined to be in use and process 300 ends. If bandwidth server 150 receives a not in-use message from content processing device 110, then process 300 proceeds to step 320.

In step 320, bandwidth server 150 sends a termination request to content server 140, typically through network 160. Generally, such a request will include a content processing device identifier to indicate which content processing device 110 is currently receiving streaming media content, but not using such media content. Further, the termination request may include a customer premises identifier.

Next, in step 325, content server 140 will stop streaming media content to content processing device 110, thereby reclaiming unused bandwidth in system 100.

Computing devices such as content processing device 110, content server 140, bandwidth server 150, and similar devices may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; open source UNIX-like operating systems such as the Linux family of operating systems distributed by several companies including Motorola, Inc. of Schaumberg, Ill. Further, such devices may use one or more open-source operating systems, and other real-time operating systems, such as the Versatile Real-Time Executive (VRTX) operating system distributed by Mentor Graphics, Inc. of Wilsonville, Oreg., or the VxWorks operating system, distributed by Wind River Systems of Alameda, Calif. Computing devices may include any one of a number of computing devices that are known, including, without limitation, a general purpose computer implemented on one or more integrated circuits, a special purpose media processing integrated circuit with an embedded/included processor, a computer workstation, a desktop, notebook, laptop, handheld computer, STB, or some other computing device.

Computing devices, such as content processing device 110 and other devices mentioned herein, generally are capable of executing instructions stored on a computer readable medium, such as instructions included in a bandwidth application 114. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media, and may be dynamically loaded from or through network 160.

A computer-readable medium includes any medium that participates in providing data (e.g., instructions), which may be read by a computer. Such a medium may take many forms, including, but not limited to, non-volatile media and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. For example, the disclosed systems and methods may be useful to a non-selective media distribution system, such as a satellite television system, a wireless distribution system, or a legacy (i.e. non-switched video) cable system. In such a non-selective media distribution system, a content provider sends a signal to customer premises 101, where the signal generally includes a plurality of media channels that can be selected and/or decoded by content processing device 110. In some systems, two-way communication is possibly by the use of telephone lines, network or Internet connections, or the like. A non-selective media distribution system may use the disclosed methods and systems to automatically allocate/manage bandwidth, for example, by moving media content or channels from one sending unit to another. For example, a satellite system may use the disclosed systems and methods to survey a plurality of content processing devices, and potentially move a media channel from a high-power transponder to a lower-powered transponder based on whether certain streaming media signals are currently in use by the content processing devices 110, thereby allocating additional bandwidth for another media channel, pay-per-view event, or the like.

The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

I claim:

1. A method, comprising:
   determining, by a server that manages unused media streams in a network, a current level of available bandwidth in the network;
   sending, by the server and based on determining the current level of available bandwidth, a bandwidth check request to a plurality of content processing devices,
   each content processing device, of the plurality of content processing devices:
      receiving a streaming media signal, from a content provider via the network,
      receiving the bandwidth check request,
      receiving a first status, and
      determining if the streaming media signal is in use based on the first status indicator;
   receiving, from each content processing device and by the server, a response to the bandwidth check request;
   determining, by the server and based on the response to the bandwidth check request received from a content processing device, of the plurality of content processing devices, whether the streaming media signal received by the content processing device is in use; and selectively causing, by the server, a termination of the streaming media signal received by the content processing device based on whether the streaming media signal, received by the content processing device, is in use, the termination of the streaming media signal, received by the content processing device, being caused when the streaming media signal received by the content processing device is not in use.

2. The method of claim 1, where the first status indicator is based on at least one of:
   a status check of a digital video recorder,
   a status check of a peripheral device,
   a time of a user command, or
   a check for a presence of a person in proximity to the content processing device.

3. The method of claim 1, where the first status indicator includes information about at least one of:
   whether a user is utilizing a digital video recorder function;
   whether the streaming media signal is being recorded;
   whether a media player is powered on;
   whether a peripheral device is receiving the streaming media signal from the content processing device via a media output port of the content processing device;
   whether a user has recently issued a command; or
   whether a person is detected in proximity to the content processing device.

4. The method of claim 1, where determining whether the streaming media signal is unused includes:
   determining that the response to the bandwidth check request comprises an in-use message,
      the content processing device sending the in-use message if the first status indicator indicates at least one of the following:
         a user is utilizing a digital video recorder function;
         the received streaming media signal is being recorded;
         a user issued a command to the content processing device within a pre-determined amount of time;
         a media player is powered on;
         a peripheral device is receiving the streaming media signal from the content processing device via a media output port of the content processing device; or
         a person is detected in proximity to the content processing device.

5. The method of claim 4, where the content processing device sends the in-use message when:
   the streaming media signal is determined to be in use based on an audio sample comparison,
      where the audio sample comparison is performed when the streaming media signal is determined to not be in use based on the first status indicator, and
      where the audio sample comparison comprises:
         obtaining a first audio sample from an audio portion of the streaming media signal;
         receiving a second audio sample from a microphone that is operatively coupled to the content processing device; and
         determining whether the streaming media signal is in use by comparing the first audio sample to the second audio sample.

6. The method of claim 5, where the audio sample comparison further comprises:
   generating a confidence value after comparing the first audio sample to the second audio sample, where the confidence value quantifies similarities between the first audio sample and the second audio sample.

7. The method of claim 1, where determining whether the streaming media signal, received by the content processing device, is in use includes:
   receiving, from the content processing device:
      an in-use message when the streaming media signal is determined to be in use by the content processing device, or
      a not in-use message when the streaming media signal is determined to not be in use by the content processing device.

8. The method of claim 1, where the plurality of content processing devices include one or more of:
   a set-top box,
   a digital video recorder,
   a personal video recorder,
   a video game console,
   a cellular phone,
   a computer,
   a hand-held video player, or
   a television.

9. The method of claim 1, where the content processing device provides a graphical dialog box to a media player based on determining that the streaming media signal is not in use by the content processing device, and
   where receiving, from each content processing device, the response to the bandwidth check request includes:
      receiving, from the content processing device, an in-use message if a user issues a command to the content processing device based on the graphical dialog box being provided, or
      receiving a not in-use message if the command is not received by the content processing device within a pre-determined amount of time.

10. The method of claim 7, where selectively causing the termination of the streaming media signal received by the content processing device includes:
   selectively causing the termination of the streaming media signal when the not in-use message is received from the content processing device.

11. The method of claim 1, where receiving, from each content processing device, the response to the bandwidth check request includes:
   receiving, from the content processing device, one or more of:
      a content processing device identifier associated with the content processing device,
      a customer premises identifier,
      a hardware address associated with the content processing device,
      a media access control address associated with the content processing device,
      an Internet protocol address associated with the content processing device, or
      a media content identifier associated with media content transmitted via the streaming media signal received by the content processing device.

12. A non-transitory computer-readable medium storing instructions, the instructions comprising:
   one or more instructions that, when executed by a processor of a server, cause the processor to:
      determine a current level of available bandwidth in a network;

send, based on determining the current level of available bandwidth, a bandwidth check request to a plurality of content processing devices,
    each content processing device, of the plurality of content processing devices:
        requesting a streaming media signal from a content server, the content server located outside of a respective local area network;
        receiving the streaming media signal;
        providing the streaming media signal to a media player,
            the media player being included in the local area network;
        receiving the bandwidth check request from the server,
            the server being located outside of the local area network;
        making a first determination as to whether the streaming media signal is in use,
            the first determination being made based on a first status indicator; and
        making a second determination as to whether the streaming media signal is in use if the first determination indicates that the streaming media signal is not in use;
    receive, from each content processing device, a response to the bandwidth check request;
    determine, based on the response to the bandwidth check request received from a content processing device, of the plurality of content processing devices, whether the streaming media signal, received by the content processing device, is in use; and
    selectively cause a termination of the streaming media signal received by the content processing device based on whether the streaming media signal, received by the content processing device, is in use,
        the streaming media signal, received by the content processing device, being terminated when the streaming media signal received by the content processing device is not in use.

13. The non-transitory computer-readable medium of claim 12, where the content processing device generates the first status indicator based on at least one of:
    a status check of a digital video recorder,
    a status check of a peripheral device,
    a time of a user command, or
    a check for a presence of a person in proximity to the content processing device.

14. The non-transitory computer-readable medium of claim 12, where the one or more instructions to receive, from each content processing device, the response to the bandwidth check request, include:
    one or more instructions that, when executed by the processor, cause the processor to:
        receive, from the content processing device, an in-use message when the first status indicator indicates at least one of:
            a user is utilizing a digital video recorder function,
            the streaming media signal, received by the content processing device, is being recorded,
            a user issued a command to the content processing device within a pre-determined amount of time,
            a media player associated with the content processing device is powered on,
            a peripheral device is receiving another streaming media signal from a media output port of the content processing device,
            where the other streaming media signal is based on the streaming media signal received by the content processing device, or
            a person is detected in proximity to the content processing device.

15. The non-transitory computer-readable medium of claim 12, where the one or more instructions to receive, from each content processing device, the response to the bandwidth check request include:
    one or more instructions that, when executed by the processor, cause the processor to:
        receive, from the content processing device:
            an in-use message when the content processing device determines that the streaming media signal is in use, or
            a not in-use message when the content processing device determines that the streaming media signal, received by the content processing device, is not in use.

16. The non-transitory computer-readable medium of claim 12, where the one or more instructions to receive, from each content processing device, the response to the bandwidth check request include:
    one or more instructions that, when executed by the processor, cause the processor to:
        receive, from the content processing device, an in-use message when the content processing device determines that the streaming media signal, received by the content processing device, is being recorded.

17. The non-transitory computer-readable medium of claim 12, where the one or more instructions to receive, from each content processing device, the response to the bandwidth check request include:
    one or more instructions that, when executed by the processor, cause the processor to:
        receive, from the content processing device, an in-use message when the content processing device receives a user issued command within a pre-determined amount of time.

18. The non-transitory computer-readable medium of claim 12, where the one or more instructions to selectively cause the termination of the streaming media signal received by the content processing device include:
    one or more instructions that, when executed by the processor, cause the processor to:
        send a request to terminate the streaming media signal, received by the content processing device, to the content server,
            the request being sent to the content server based on receiving a not in-use message from the content processing device.

19. The non-transitory computer-readable medium of claim 12, where the one or more instructions to receive, from each content processing device, the response to the bandwidth check request include:
    one or more instructions that, when executed by the processor, cause the processor to:
        receive, from the content processing device, an identifier, included in an in-use message or a not in-use message,
            where the identifier includes one or more of:
                a content processing device identifier associated with the content processing device,
                a customer premises identifier,
                a hardware address associated with the content processing device, a media access control address associated with the content processing device, an Internet protocol address associated with the content processing device, or a media content identifier associated with media content transmitted via the streaming media signal received by the content processing device.

20. A system, comprising:

one or more devices to:

receive a notification indicating that a bandwidth utilization, of a plurality of content processing devices that receive a streaming media signal from a content server, has reached a particular level;

send, based on receiving the notification, a bandwidth check request to each content processing device of the plurality of content processing devices, where, after receiving the bandwidth check request, a content processing device, of the plurality of content processing device, determines whether the streaming media signal is in use based on at least one of:

a status of a digital video recorder, a status of a peripheral device, a time at which the content processing device last receive a user command, a presence of a person in proximity to the content processing device, or an audio sample comparison between a first audio sample obtained from the streaming media signal and a second audio sample received via a microphone associated with the content processing device;

receive, from each content processing device, a response to the bandwidth check request;

determine, based on the response to the bandwidth check request received from a content processing device, of the plurality of content processing devices, whether the streaming media signal received by the content processing device is in use; and selectively cause a termination of the streaming media signal received by the content processing device based on whether the streaming media signal, received by the content processing device, is in use, the streaming media signal, received by the content processing device, being terminated when the streaming media signal received by the content processing device is not in use.

21. The system of claim 20, where the one or more devices are further to:

cause a media channel to be moved from a first transponder to a second transponder based on selectively causing the termination of the streaming media signal received by the content processing device, the first transponder comprising a higher-powered transponder relative to the second transponder.

22. The system of claim 20, where, when determining whether the streaming media signal, received by the content processing device, is in use, the one or more devices are to:

determine that the streaming media signal, received by the content processing device is not in use; and where, when selectively causing the termination of the streaming media signal received by the content processing device, the one or more devices are to:

send, to the content server, a request to terminate the streaming media signal received by the content processing device.

23. The system of claim 20, where the one or more devices are further to:

re-allocate bandwidth within a network based on selectively causing the termination of the streaming media signal received by each content processing device.

\* \* \* \* \*